Sept. 13, 1966     G. KARNATH     3,271,968
METHODS AND APPARATUS FOR COOLING MILK FOR
USE WITH MILKING MACHINES
Filed May 28, 1965     4 Sheets-Sheet 1

GÜNTHER KARNATH,

INVENTOR

BY *Stephen H. Frishauf*
Atty.

United States Patent Office 3,271,968
Patented Sept. 13, 1966

3,271,968
METHODS AND APPARATUS FOR COOLING MILK FOR USE WITH MILKING MACHINES
Günther Karnath, Eschenhahn, Taunus, Germany, assignor of twenty-five percent to Dipl.-Ing. Dr. Kurt Karnath, Wiesbaden, Germany, and fifty percent to Max Henry Hoepli, New York, N.Y.
Filed May 28, 1965, Ser. No. 459,570
Claims priority, application Germany, June 3, 1964, K 53,115; Mar. 23, 1965, K 55,615; Apr. 21, 1965, K 55,865
5 Claims. (Cl. 62—59)

The present invention relates to a method, and apparatus to carry out the method, to cool milk which is being pumped and handled by milking machines; and more particularly to cool such milk derived from the milking machines and subject to a partial vacuum.

Milk being handled by milking machines has to be cooled as soon as possible. In small installations, available water is generally used for such cooling. This has a disadvantage that a substantial amount of water is being used, and that the milk further does not reach the desired low temperature of approximately 4 to 6° C. Larger installations may use refrigeration machinery, which readily can cool the milk to the temperature of 4 to 6° C; such refrigeration machinery however is not economical in operation since it is used only during the period of actual milking, that is for about one and one-half hours, and during this period it must cool the milk from approximately 36° C. to the region of 4 to 6° C. A large refrigeration system is necessary in order to effect such cooling. Additionally, if the refrigeration cooling coils are directly in contact with the milk being derived from the milking machine, milk which is being supplied in intermittent pulses to the cooling system may not be cooled to as low a temperature as desired, whereas milk dripping between pulses may be cooled too much. Additionally, machinery presently used loses a good deal of cooling effectiveness to the surrounding ambient air, particularly since the milk itself will be in contact with the surrounding container where heat will be absorbed by conduction.

It is an object of the present invention to provide a refrigeration method, and apparatus to carry out such method, in which the coldness developed by the refrigeration machine can be more efficiently utilized.

It is a further object of the present invention to provide a method, and apparatus, to cool milk which is suitable for small or medium installations, does not require a large water supply, or a large capital investment.

Briefly, the present invention relates to a method of economically pumping and cooling milk which is intermittently obtained from a milking machinery supply. A refrigeration unit is provided which operates substantially constantly. The cooling coils of the refrigeration unit are exposed to a cooling fluid such as water. A closed circuit for the water is provided, which includes the outside of the refrigeration coils and a heat exchanger where heat from the milk can be absorbed and transferred to the refrigeration coils, for re-cooling of the water. Since the refrigeration unit operates substantially constantly, a layer of ice will build up around the refrigeration coils. When milk is being delivered, that is when water is being pumped from the space surrounding the refrigeration coils to the heat exchanger, the ice will melt. The ice thus acts as a coldness storage means. By storing this coldness, a much smaller refrigeration machine can be utilized, and yet a large quantity of milk, intermittently supplied, can be cooled to the proper temperature. The water itself will not be used since it will remain in the closed system and only so much as is lost, for example through leakage, need be replaced.

A particular advantageous form of the apparatus to carry out the method of the present invention includes a coldness storing section in an insulated housing, in which the refrigeration evaporation coils are located. Water inlets and outlets are arranged at opposite sides, or corners (if the housing is rectangular) of the housing. The heat exchanger itself is constructed in such a manner that the milk is led into a first chamber, directly from the milking machine. The first chamber communicates with a second, or cooling chamber, through orifices of such size that milk supplied to the first chamber by intermittent, or pulsed jets, will just be able to run off through the orifices and provide the uniform milk flow through the cooling chamber. Preferably the chambers are arranged vertically on top of each other and the entire heat exchanger assembly is closed off by a top cover, which is removable. Upon removal of the cover, access can be gained to the interior for cleaning, or the cover can be replaced entirely with a different cover having a cleaning or washing attachment secured thereto.

The structure, organization and operation of the invention will now be described more specifically in the following detailed description with reference to the accompanying drawings, in which.

Figure 1:
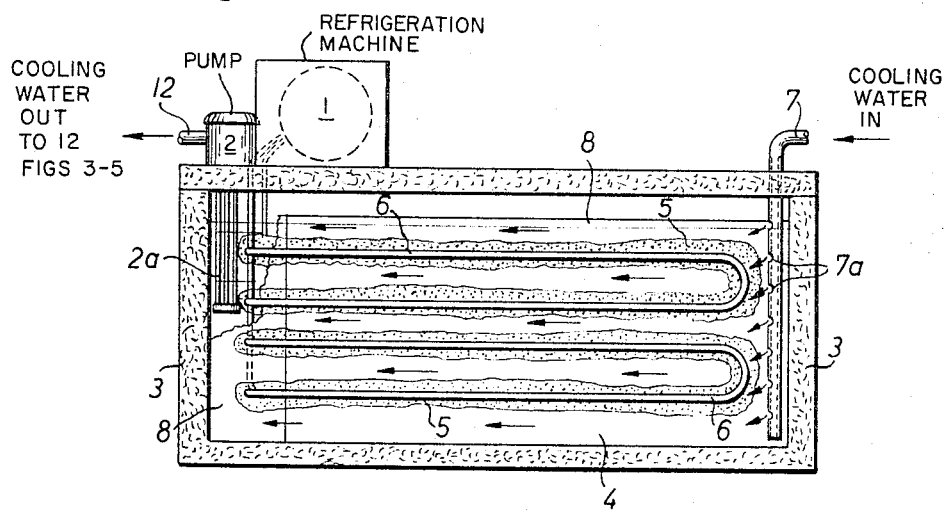
FIG. 1 is a vertical sectional view of an insulated coldness storage section.
Figure 2:
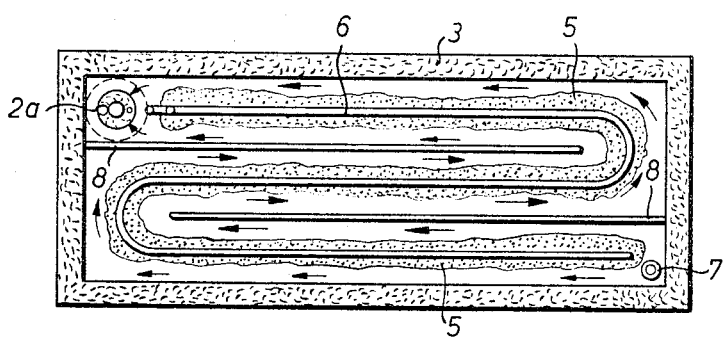
FIG. 2 is a horizontal sectional view through the coldness storage section of FIG. 1.

Referring now to the drawings, and more particularly to FIGS. 1 and 2:

A refrigeration machine, shown schematically at 1, has evaporator or cooling coils 6 located within an insulated housing 3. Instead of an insulation material in the housing, a double walled container with a vacuum between the walls could also be used. The evaporator and cooling coil 6 are looped within the housing 3 both horizontally as well as vertically. The vertical loops are separated by vertical partitions 8 (FIG. 2). A heat exchange cooling liquid is introduced through a tube 7, which escapes through holes 7a formed therein. Diagonally across from the tube 7 is a suction conduit 2a, connected to a suction pump 2, which circulates the cooling liquid through housing 3 and the heat exchanger with the milk, as will appear further below. It has been found that the individual, paralleled tubes of the cooling coils 6 are preferably spaced from each other by a distance of about 12 to 15 cm. A small, commercial refrigeration unit, operating about 8 to 12 hours daily, will then cause a layer of ice 5 to form along the cooling coils, which will have approximately half of the thickness between the coils themselves. During milking, when water is circulated through the housing by being introduced through tube 7 and withdrawn through tube 2a, the ice will be melted and transfer its coldness to the cooling fluid. The exit temperature of pipe 12 near the suction pump 2 will then be approximately 0 to +1° C., whereas the entrance temperature of the cooling means in pipe 7 will be approximately 6 to 7° C.

Figure 3:
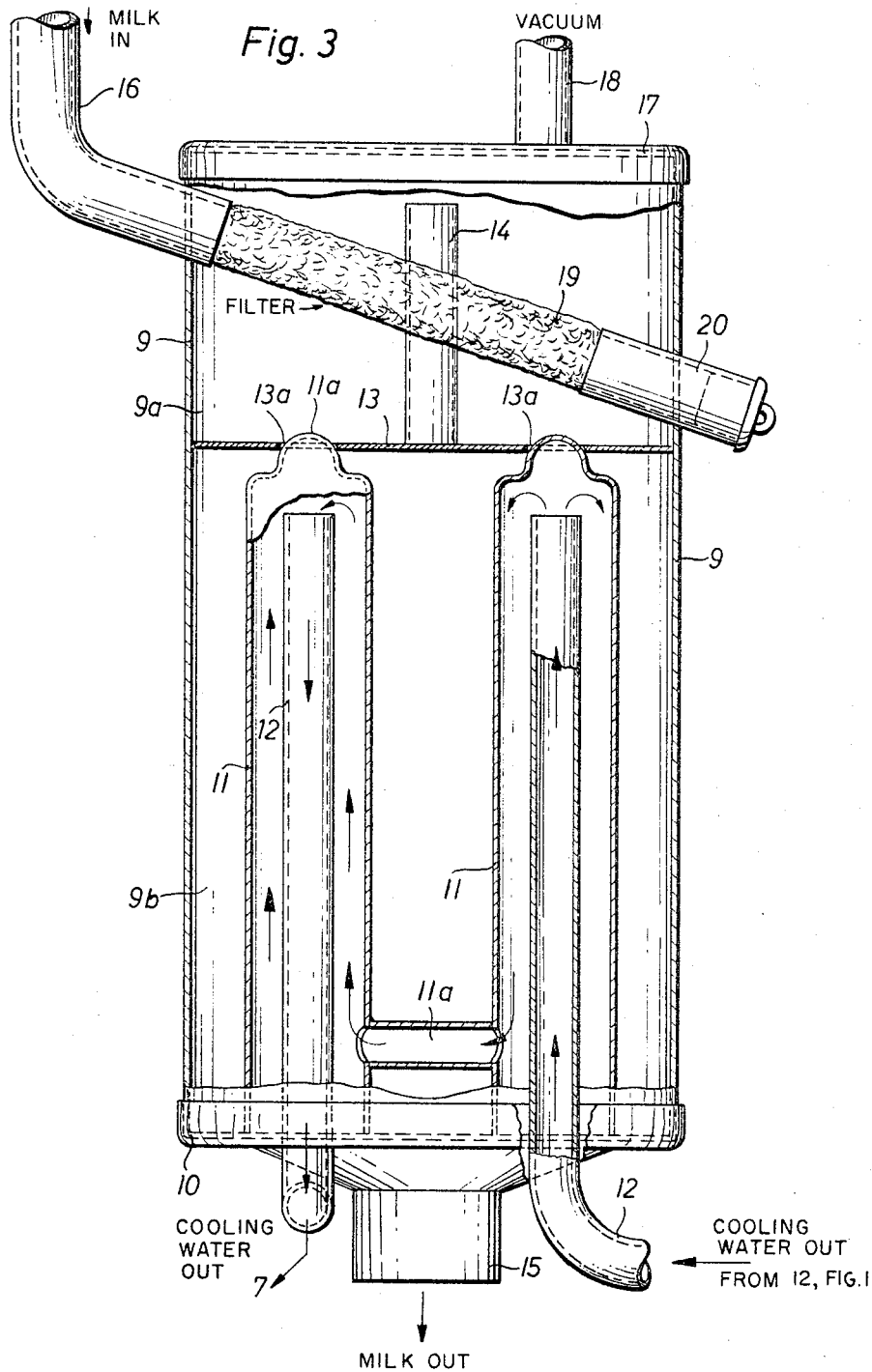
FIG. 3 is a vertical sectional view of a heat exchanger for milk.

Referring now to FIG. 3, the cooling liquid pumped by pump 2 into pipe 12 is introduced into a cooling cylinder 11 within a heat exchanger 9. Heat exchanger 9 preferably contains a plurality of such cooling cylinders 11, symmetrically arranged therein. Cooling cylinders 11 are by themselves connected by means of pipe stubs 11a, only one of which is shown, and which may interconnect the space exterior of tube 12 (as shown in FIG. 3) or communicate such exterior space with an interior tube 12 in another cylinder. The upper portion of the heat exchanger 9 is separated by means of a horizontal partition 13, thus forming a cooling chamber 9b and a milk supply chamber 9a. Partition 13 is formed with openings through which caps 11a of the cooling cylinders 11 project. A small space, 13a, is left between the partition 13 and the caps 11a. This space is so dimensioned that the cross sectional area of all spaces 13a is smaller than the cross sectional area of a milk supply tube 16, which leads milk into the milk collecting chamber 9a. Since by the nature of milking machinery, a vacuum will be maintained within the heat exchanger, there will be little heat radiation to the outside from the cooling chamber 9b. Milk introduced through tube 16 is filtered in a milk filter 19 located in the tube. The other end of tube 16 is closed off by a closing member 20 which is accessible from the outside, to permit removal or cleaning of filter 19. Vacuum from the vacuum system is taken out from the cover 17 of the heat exchanger by means of a vacuum connection 18. A tube 14 is provided in the partition 13 to connect vacuum from the cooling chamber 9b to milk supply chamber 9a.

Milk, which may arrive in intermittent spurts from the milking machine uniformly flows through orifices 13a and along the wall of the cooling cylinders in a thin film. It is removed, cooled, at the bottom of the heat exchanger by a removal funnel 15.

Figure 4:
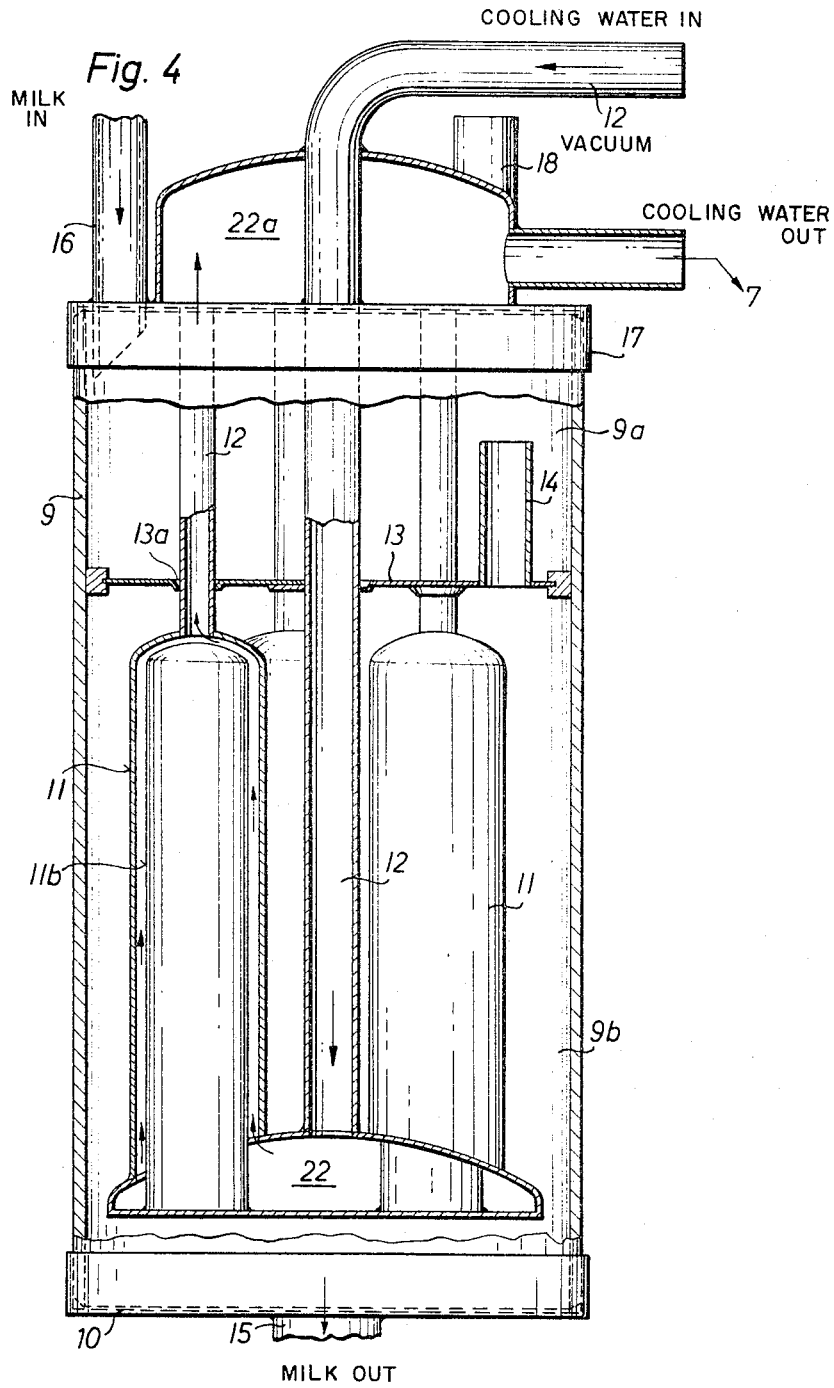
FIG. 4 shows a different embodiment of a heat exchanger.

FIG. 4 illustrates a different embodiment of a heat exchanger, similar to that shown in FIG. 3. The cooling medium introduced through line 12 is led to an intake chamber 22 which centrally supplies all cooling cylinders. The cooling cylinders 11, similar to the cooling cylinders 11 of FIG. 3, are interiorly closed off by an interior form 11b, which may be a hollow cylinder, in order to provide only a small gap between the outside of cooling cylinder 11 and the region in which the cooling liquid from pipe 12 can circulate. By making the cross sectional area between the interior form 11b and the cooling cylinder 11 rather small, the speed of the cooling medium along the interior wall of cooling cylinders 11 is increased substantially, and thus the heat exchange capabilities are improved. The cooling medium itself is removed through a central chamber 22a, and conducted back to the coldness storage section through tube 7. Milk, introduced through tube 16, may be filtered externally. In all other respects the embodiment of FIG. 4 is similar to that of FIG. 3, and similar parts have been supplied with similar reference numerals. The construction according to the embodiment shown in FIG. 4 has the advantage that all portions of the heat exchanger, and all connections are in the top cover 17 and that the bottom, shown as a separate element 10, is completely free. Thus it is possible to remove the top cover 17, together with all the connections, and replace top cover 17 by another and similar one which contains a washing or scrubbing apparatus.

Figure 5:
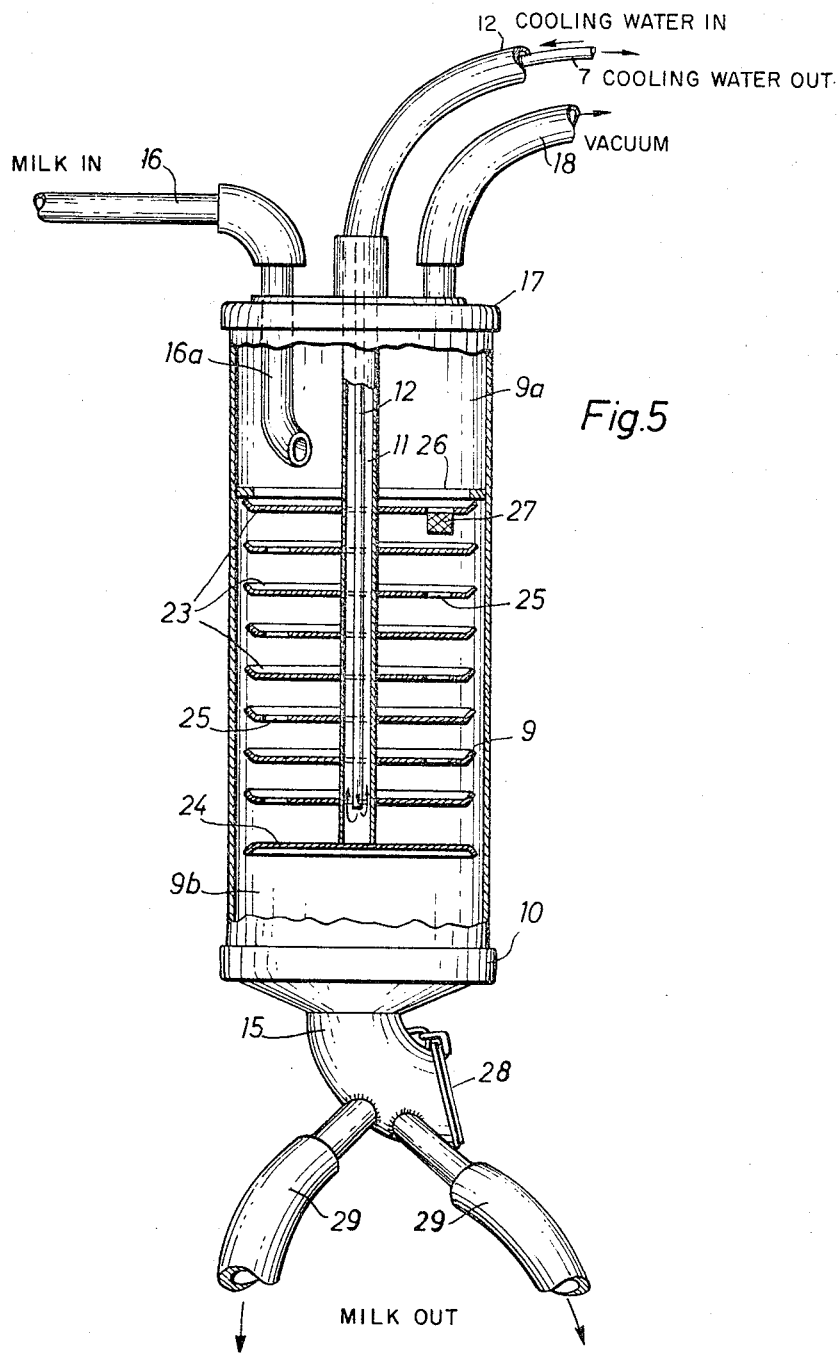
FIG. 5 shows another embodiment of a heat exchanger having both direct and indirect cooling means.

FIG. 5 illustrates a different embodiment of the present invention. The cooling medium is again supplied through tube 12, and removed through tube 7 which is located concentrically therewith. Tubes 12 and 7 are arranged centrally of a cylindrical heat exchanger, again separated into two chambers 9a, 9b. A central cooling cylinder 11, as before, is provided. A plurality of dish-shaped baffles 23 are secured to the cooling cylinder 11. The top-most of the baffles 23 is sealed against a sealing ring 26 thus separating the top, or milk receiving chamber 9a from the bottom or cooling chamber 9b. Each one of the baffles 23 is formed with an opening 25 therein. The openings are located staggered, or offset on alternate sides from each other. The lower-most baffle 23 is inverted, so that the dished edge faces downwardly. No opening is provided in the lower-most baffle 24. A filter 27 is preferably connected to the opening 25 of the top-most baffle 23. Each one of the openings 25 has a cross sectional area which is less than the cross sectional area of the supply tube 16, however, sufficiently great to provide for a steady flow of the milk delivered through the filter 27, without any milk rising over the edges of the dished baffles. The apparatus according to FIG. 5 requires only a single central cooling cylinder and thus less space, since the single cooling cylinder and the baffles, or fins, transmit coldness directly to the milk. A metallic connection between the baffles 23, 24 provides for good heat, or in this case coldness, transfer; the large area of the baffles permits a very thin layer of milk thereon, thus providing for effective cooling. No milk will collect within the cooling chamber 9b. The removal tube 15 is arranged to have a larger diameter than the supply tube 16, and certainly larger than the openings 25 in the baffles themselves. Removal tube 15 is preferably provided with external insulation. The vacuum within the chambers 9a and 9b, for connection through tube 18 as before, provides for good heat insulation of the heat exchanger 9. A pair of additional removal pipes 29 are illustrated in FIG. 5 for filling of individual milk containers. Access for cleaning, or for connection to another system is provided through a closure 28.

The arrangement according to FIG. 5 is particularly easy to clean. The cover 17 may be removed and access is obtained for cleaning; as before, cover 17 can be exchanged with another cover already provided with a washing or scrubbing apparatus.

Refrigeration unit 1, and pump 2 (FIG. 1) are preferably driven by an electrical, or gasoline motor having a pair of output shafts. The vacuum apparatus necessary for operating the milking machine may likewise be driven from the same motor, not shown specially in the drawings.

I claim:

1. A method of economically pre-cooling milk intermittently pumped from a milking machine to a collection point and arriving in spurts comprising, operating a refrigeration unit substantially constantly; exposing the cooling coils of said refrigeration unit to circulating water whereby a layer of ice will build up on the cooling coils to store coldness; intermittently passing milk in spurts through a filter to a collection chamber; withdrawing milk in a smooth stream from said chamber, passing the milk exteriorly of a heat exchanger, and cooling said smoothly flowing milk by passing said circulating water interiorly of said heat exchanger whereby the ice coating on said refrigeration coils will thin and supply coldness from storage evenly to said milk during intermittent milk pumping.

2. Apparatus for pre-cooling milk delivered from a milk supply line comprising a coldness storage section and a heat exchanger section, said coldness storage section including an insulated casing; refrigeration evaporator coils in said casing; means introducing a heat exchange liquid into said casing, said coils being spaced from each other a sufficient distance to permit accumulation of frozen heat exchange liquid during several hours of operation without withdrawal of heat exchange liquid subject to external heat absorption; means to withdraw heat exchange liquid from said casing; said heat exchanger section including a housing; means dividing said housing into a pair of superposed chambers the upper one of said chambers being connected to milk supply line; orifice means interconnecting said chambers, said orifice means being of lesser cross-sectional area than said milk supply line; and heat exchanger means in the lower one of said chambers forming a closed fluid circuit to circulate said heat exchange liquid therein, said heat exchange means being connected to said liquid withdrawal means of the coldness storage section and having an outer surface exposed to milk passing through said orifice means to cool said so passing milk.

3. Apparatus as claimed in claim 2 wherein said heat exchange means includes a plurality of upright cylinders located in said housing and in liquid communication with said coldness storage section; a baffle is provided dividing said housing into said superposed chambers, said baffle being formed with openings therein; said cylinders extending through said openings and being of slightly smaller size to form said orifice means between the baffle openings and the cylinders.

4. Apparatus as claimed in claim 2, wherein said heat exchanger means includes, a vertically downwardly extending heat exchange liquid supply tube located within said housing; a plurality of spaced, stacked horizontal dished baffles secured to said downwardly extending supply tube, adjacent baffles having openings formed therein offset with respect to each other.

5. Apparatus as claimed in claim 2, wherein said heat exchanger housing is generally cylindrical, vertically arranged and includes a removable top cover having said means to circulate heat exchange fluid secured thereto; and a removable cover having a washing means associated therewith fitting on said heat exchanger section interchangeable with said top cover.

References Cited by the Examiner
UNITED STATES PATENTS

| | | | |
|---|---|---|---|
| 2,702,019 | 2/1955 | Duncan | 62—434 XR |
| 2,858,677 | 11/1958 | Stone | 62—434 XR |
| 2,944,966 | 7/1960 | Eickmeyer | 165—118 XR |
| 3,120,742 | 2/1964 | Denisoff | 62—434 |

ROBERT A. O'LEARY, *Primary Examiner.*

MEYER PERLIN, *Examiner.*

W. E. WAYNER, *Assistant Examiner.*